May 15, 1956  I. Z. SMOKER  2,745,540
EXTENSION FOR LOADING AND UNLOADING APPARATUS
Filed Aug. 11, 1952  5 Sheets-Sheet 1
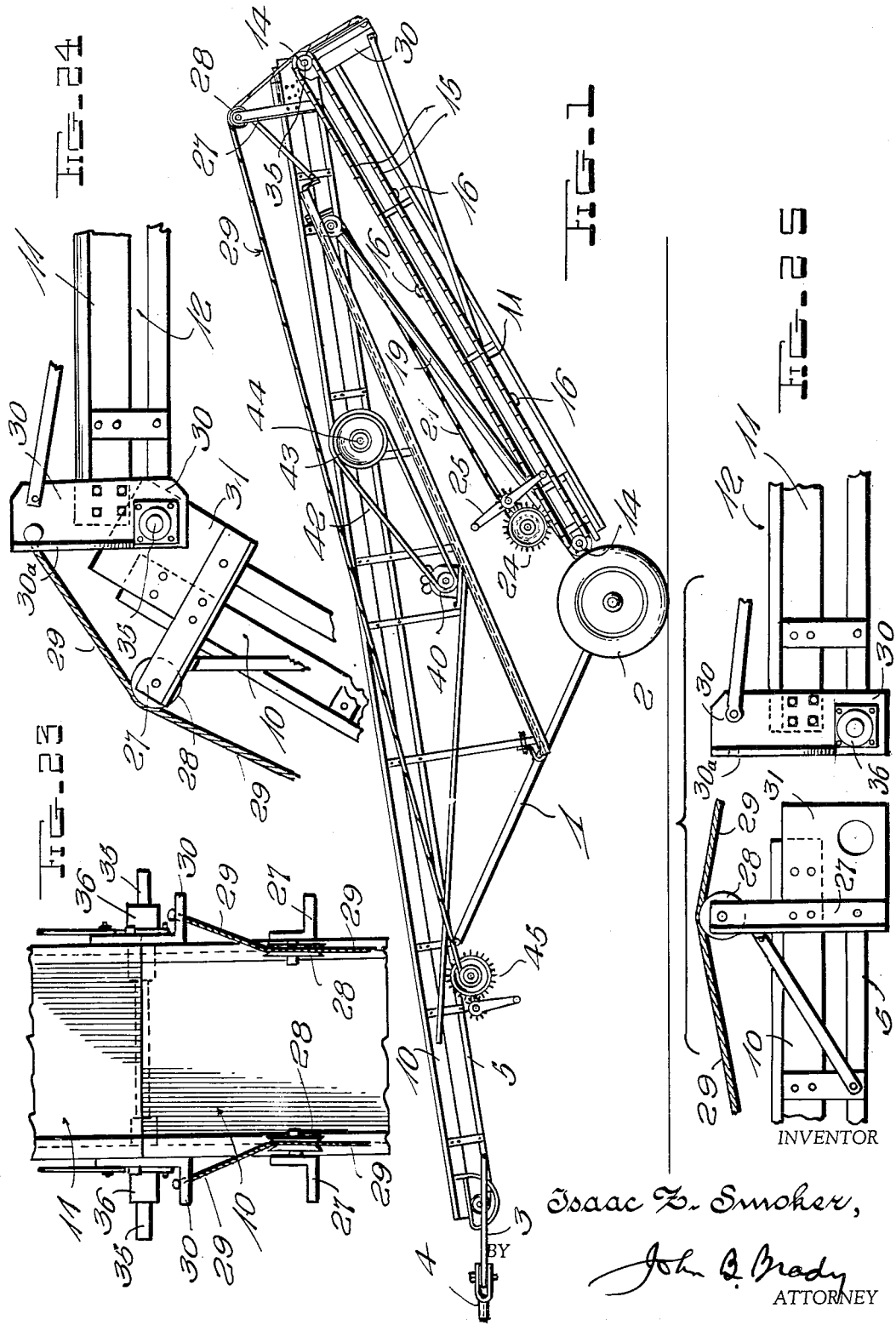
INVENTOR
Isaac Z. Smoker,
BY John B. Brady
ATTORNEY May 15, 1956  I. Z. SMOKER  2,745,540
EXTENSION FOR LOADING AND UNLOADING APPARATUS
Filed Aug. 11, 1952  5 Sheets-Sheet 2
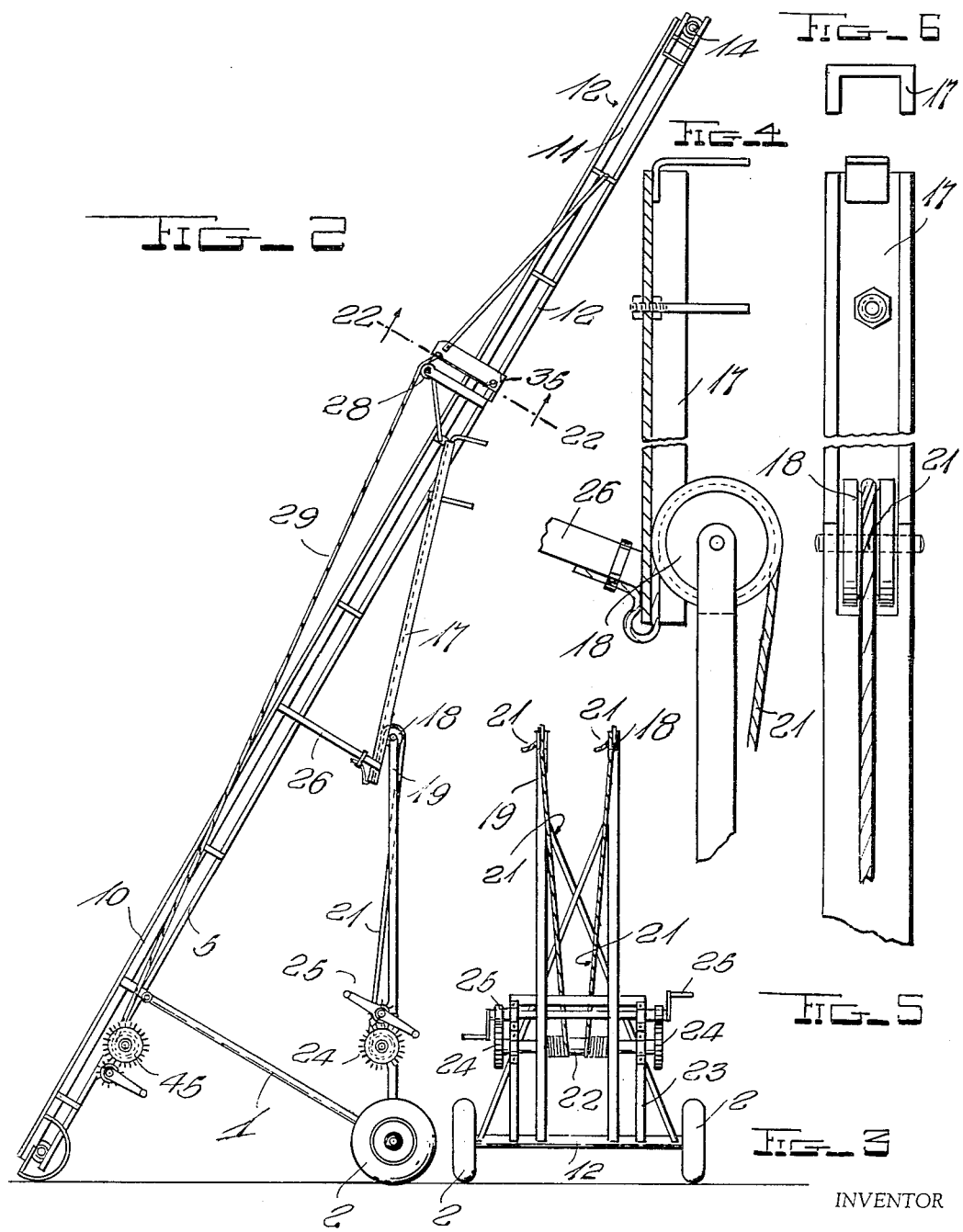
INVENTOR
Isaac Z. Smoker,
BY
John B. Brady
ATTORNEY May 15, 1956  I. Z. SMOKER  2,745,540
EXTENSION FOR LOADING AND UNLOADING APPARATUS
Filed Aug. 11, 1952  5 Sheets-Sheet 3
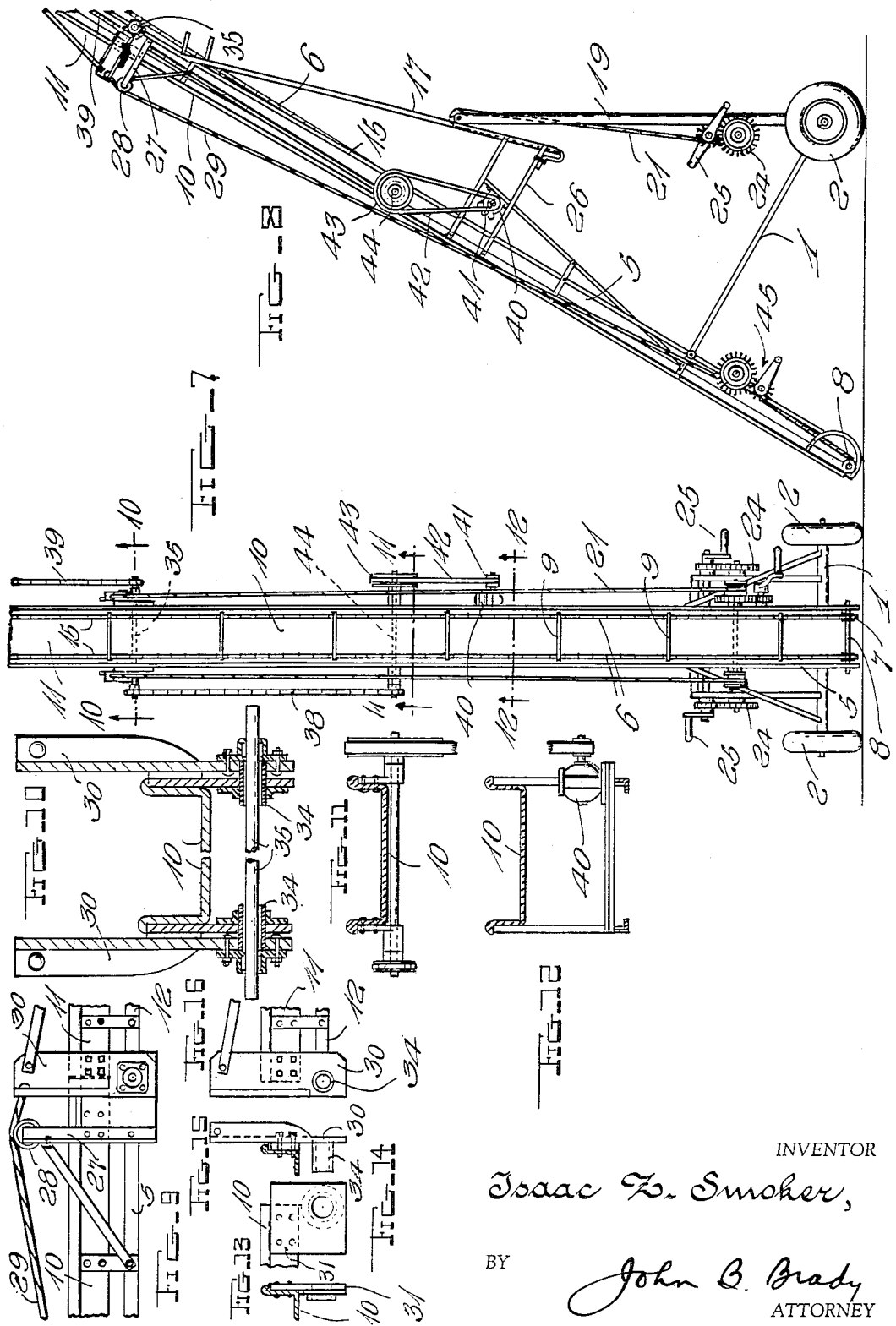
INVENTOR
Isaac Z. Smoker,
BY
John B. Brady
ATTORNEY

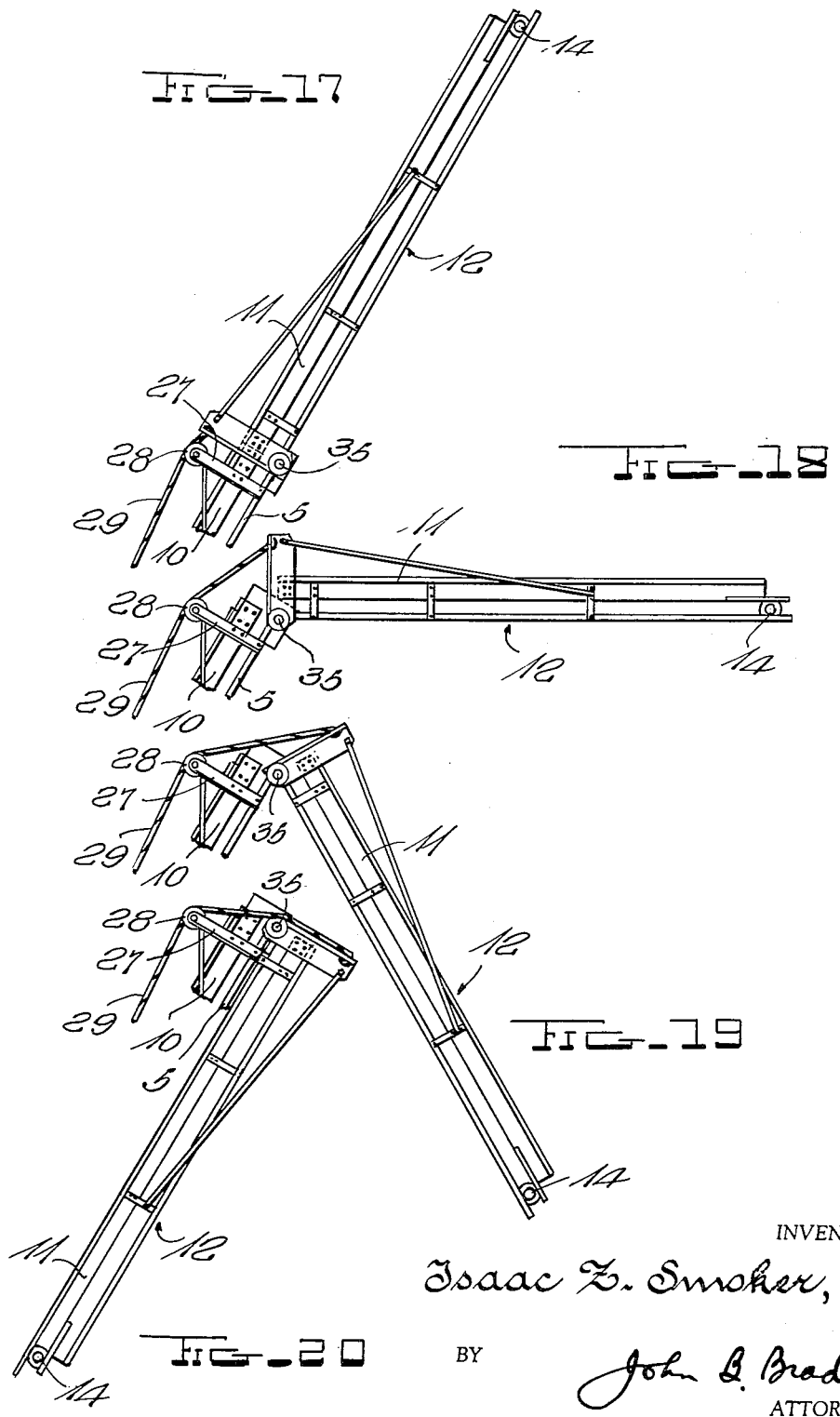

May 15, 1956  I. Z. SMOKER  2,745,540
EXTENSION FOR LOADING AND UNLOADING APPARATUS
Filed Aug. 11, 1952  5 Sheets-Sheet 5
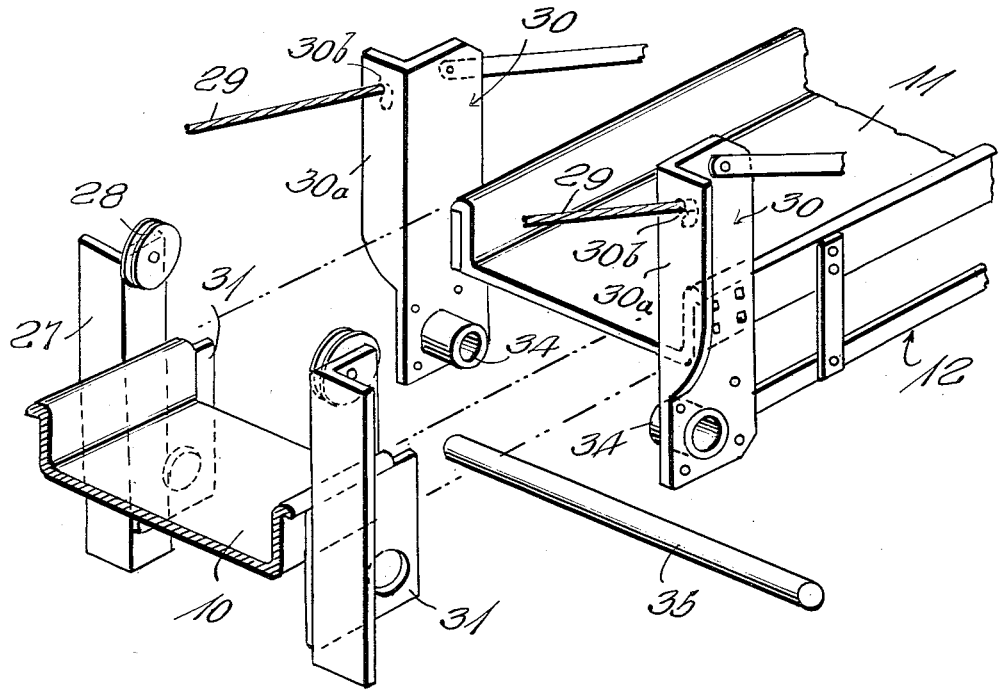
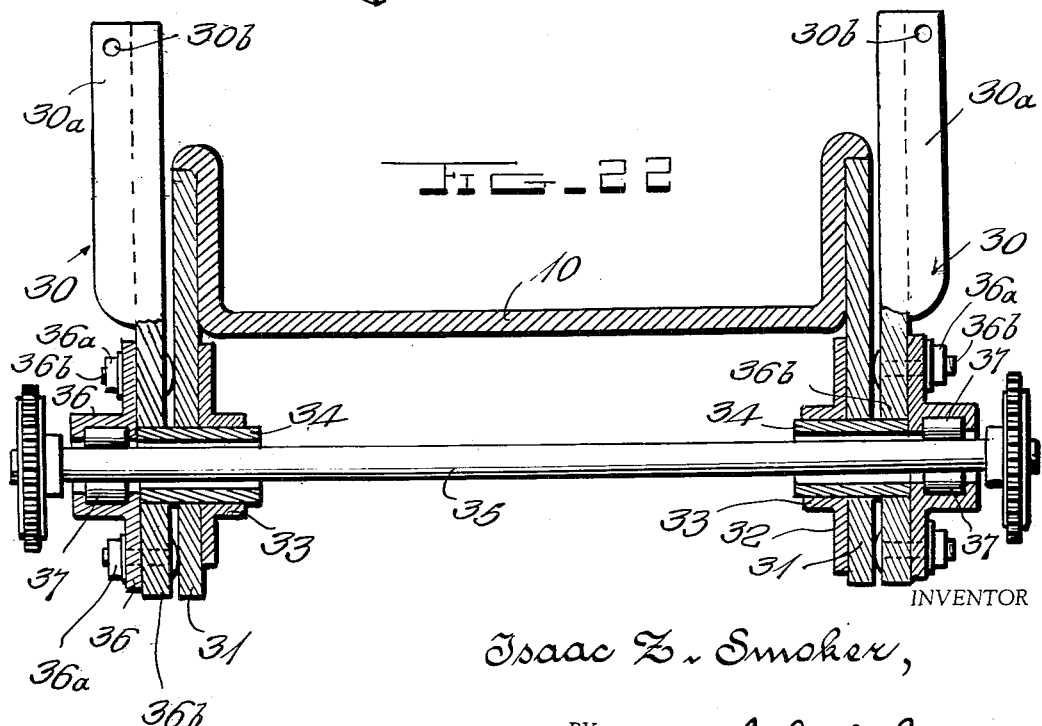
INVENTOR
Isaac Z. Smoker,
BY John B. Brady
ATTORNEY United States Patent Office 2,745,540
Patented May 15, 1956

2,745,540

EXTENSION FOR LOADING AND UNLOADING APPARATUS

Isaac Z. Smoker, Intercourse, Pa.

Application August 11, 1952, Serial No. 303,676

4 Claims. (Cl. 198—115)

My invention relates broadly to loading and unloading apparatus, and more particularly to an arrangement of an extension for a loading and unloading apparatus.

One of the objects of my invention is to provide an arrangement of extension for an elevating conveyor of the type set forth in my invention on Loading and Unloading Apparatus disclosed in my application Serial No. 703,447, filed October 15, 1946, Patent No. 2,606,648, dated August 12, 1952.

Another object of my invention is to provide an arrangement of extension for an endless conveyor which may be readily folded under the main conveyor for facilitating transportation and storage and which will provide, when in use, approximately seventeen and one-half additional feet of elevating capacity over and above the main conveyor.

Still another object of my invention is to provide a construction of extension conveyor for a main conveyor which may be readily aligned with the main conveyor for increasing the elevating capacity thereof, all which may be folded under the main conveyor for enabling the entire conveyor to be readily towed along a highway and/or placed in storage.

Still another object of my invention is to provide an arrangement of coupling means between the frame of a main conveyor and the frame of an extension conveyor by which the weight of the extension conveyor is distributed along the pivot shaft of the apparatus and the bearings located adjacent the exterior sides of the apparatus leaving the internal portions of the hinged connection free and clear.

A still further object of my invention is to provide a method of coupling the ends of an extension and main conveyor by which the main and extension frames are mechanically reinforced and propulsion forces transmitted through the main frame to the extension frame for operating the extension conveyor under various conditions of loading.

Other and further objects of my invention reside in a construction of hinged pivot and associated reinforcement means between the main frame and the extension frame of an extendable endless conveyor, as set forth more fully in the specification hereinafter following by reference to the accompanying drawings, in which:

Figure 1 is a side elevational view of the main conveyor frame and extension conveyor frame showing the extension conveyor frame folded beneath the main conveyor frame for transportation or storage; Fig. 2 is a side elevational view showing the extension conveyor frame raised to maximum operating height in alignment with the main conveyor frame; Fig. 3 is an end elevational view of the elevating control means for the main conveyor frame; Fig. 4 is an enlarged fragmentary vertical sectional view showing one of the elevating control means for the main conveyor frame, certain of the parts being shown in elevation; Fig. 5 is an elevational view of the elevating control means shown in Fig. 4; Fig. 6 is an end view of the elevating control means shown in Fig. 5; Fig. 7 is an elevational view showing the extension conveyor raised to maximum elevating position with relation to the main conveyor and showing particularly the control mechanism for raising the extension conveyor, the view showing the extension conveyor broken away at the top in order that the parts may be illustrated on a sufficiently large scale to show the co-action thereof; Fig. 8 is a side elevational view of the apparatus illustrated in Fig. 7 and illustrating the extension conveyor raised to maximum elevated position and broken away in a manner similar to that shown in Fig. 7; Fig. 9 is a fragmentary side elevational view illustrating the manner of aligning the extension conveyor with the main conveyor; Fig. 10 is a cross-sectional view taken through the coupling means between the main conveyor and the extension conveyor; Fig. 11 is a transverse sectional view taken substantially on line 11—11 of Fig. 7; Fig. 12 is a transverse sectional view taken substantially on line 12—12 of Fig. 7; Fig. 13 is a fragmentary cross-sectional view showing one side of the journaling means for the hinge as secured to the main conveyor frame; Fig. 14 is a side elevational view of the hinge attached to the main conveyor frame; Fig. 15 is an end elevational view of the reinforcement support which is attached to the extension conveyor frame; Fig. 16 is a side elevational view of the reinforcement support attached to the extension conveyor frame; Fig. 17 shows the upper extremity of the main conveyor frame and the elevated alignment therewith of the extension conveyor frame for the maximum elevated position of the extension conveyor frame; Fig. 18 shows the extension conveyor frame lowered to a substantially horizontal position for co-action with the main conveyor frame; Fig. 19 illustrates the extension conveyor frame being moved to a collapsed position below the main conveyor frame; Fig. 20 shows the extension conveyor frame moved to a position under the main conveyor frame preparatory for transportation and/or storage; Fig. 21 is a perspective view of the superimposed parts of the main conveyor frame and extension conveyor frame illustrating the manner in which the reinforced coupling between the parts is effected; Fig. 22 is an enlarged transverse vertical section taken substantially on line 22—22 of Fig. 2; Fig. 23 is a plan view showing the main and extension conveyors abutting end to end; Fig. 24 is an enlarged fragmentary view showing the coupling means formed by the hinges with the extension conveyor frame orienting about the main conveyor frame; and Fig. 25 is a side view showing the manner in which the extension conveyor frame is matched to the end of the main conveyor frame.

My invention is directed to an extension type of endless conveyor of the general construction set forth in my application Serial No. 703,447, filed October 15, 1946, for Loading and Unloading Apparatus, now Patent No. 2,606,648, dated August 12, 1952, by which an operating height of approximately 47½ feet may be obtained or approximately an additional operating height of 17½ feet beyond that normally obtainable with the apparatus of the aforesaid patent. I provide means on the main conveyor frame for raising an extension conveyor frame into alignment with the main conveyor frame for use with silos capable of loading 20 to 30 tons per hour, using a gasoline engine drive of from 3 to 3½ horsepower or an electric motor drive of 2 horsepower. The means for elevating the extension conveyor is conveniently operated from the frame of the main conveyor for raising the extension conveyor from a position collapsed beneath the main conveyor to a horizontal position in which position the extension conveyor may be used for loading and unloading in co-action with the main conveyor and to an aligned position fully extended with respect to the main conveyor for providing the maximum operating height for the apparatus. I provide a special reinforcement structure by which the weight of the extension frame is supported from bearing positions adjacent the external ends of the pivot shaft about which the extension frame is oriented in moving from a stored position to an aligned position of use and all frictional bearing forces eliminated from the inner or central portion of the main conveyor frame. Repair and maintenance of the equipment are thus greatly facilitated as the bearings are located in readily accessible positions. The hinge structure for interconnecting the extension frame with the main frame is very rugged and reliable, insuring continuous operation of the equipment over an extended useful life.

Referring to the drawings in detail, reference character 1 designates a chassis supported on wheels 2 which serve as a mount for the entire machine, enabling the machine to be readily attached to a vehicle through the draw bar connection 3 shown in Fig. 1 and towed through the tow bar 4. The chassis 1 supports the main frame 5 of the main conveyor of the type shown in my aforesaid Patent No. 2,606,648 of August 12, 1952, wherein endless chains 6 are engaged by sprocket wheels 7 carried by shafts such as 8 distributed along the main frame 5. The sprocket chains 6 carry load-engaging bars 9 at spaced intervals along the length thereof for elevating the load such as bags, bales, ear corn and grain through the main trough 10 from the lowermost loading position to the top of the main conveyor frame. The extension conveyor frame is shown at 12 containing extension trough 11 which is alignable end to end with the main trough 10 when the extension conveyor is elevated to its maximum height. The extension conveyor frame 12 also provides journaling means for shafts 14 distributed along the length thereof and carrying sprocket wheels which engage sprocket chains 15 which are linearly aligned with the sprocket chains 6 of the main conveyor frame. The extension conveyor also includes transverse load-engaging bars such as 16 for moving the load delivered at the top of the main conveyor onto the extension conveyor.

In order to elevate the entire conveying apparatus with respect to chassis 1, I provide rail member 17 at each side of the main frame 5, forming a trackway engaged by roller members 18 journaled in the upper extremities of the standards 19 supported on chassis 1. The roller members 18 are peripherally grooved for the passage of cable 21 thereover from the reel or windlass 22 journaled in frame 23 supported on chassis 1. The reel or windlass 22 is driven through gear systems 24 from opposite sides of the apparatus through cranks 25 which may be manually engaged for raising the main frame of the conveyor from the stowed or transportation position to the operating position shown in Fig. 2 where the machine is stabilized by reinforcement members 26 engaged with tracks 17. The main frame having thereupon been elevated to operating position is then used for elevating the extension frame 12 from the position illustrated in Fig. 1 or 20 to the position illustrated in Fig. 17.

The main conveyor frame 5 carries upwardly extending posts or brackets 27 disposed adjacent the upper end of the main conveyor frame, each of said posts or brackets having a grooved roller or pulley 28 journaled therein and providing guide means for cables 29 that connect with the upper ends of the angle members 30 attached to said extension conveyor frame. The posts 27 are located in a position spaced rearwardly from the extremity of the trough 10 and the angle members 30 are offset forwardly with respect to the end of the trough 10. The side walls 11 of the trough 10 carry side plates or bracket members 31 which extend forwardly of the end of the trough 10 as shown and provide supports for the upwardly extending posts 27. The side plates or brackets 31 are each provided with flange plates 32 thereon having inwardly directed sleeves 33 welded thereto. The sleeves 33 have an internal diameter sufficient to receive the projecting ends of the tubular sleeves 34 carried by the lower extensions of angle members 30 associated with the extension conveyor frame 12 and trough 11. When assembled, the sleeves 34 project inwardly through brackets 31 and form a spaced housing through which the pivot shaft 35 which constitutes the center about which the extension conveyor frame 12 orients with respect to the main conveyor frame 5. The angle members 30 also provide supporting means for the roller bearing housings 36 in which roller bearings 37 are confined. Thus the mass of the extension conveyor frame is carried by the main conveyor frame through roller bearings 37 at the extreme outside limits of the structure and there is no support for the extension conveyor frame on the main conveyor frame directly below the extension conveyor frame. This arrangement facilitates the replacement of the side plates or bearing housings 36 from the exterior of the structure by removal and replacement of the nuts 36a on fastening bolts 36b.

The extension conveyor consisting of sprocket chains 15 and load elevating bars 16 is driven from the main conveyor through sprocket chain 38, cross-shaft 35 and sprocket chain 39 to the cross-shaft 14 at the extreme limit of the extension conveyor frame. Any suitable prime mover may be employed for operating the main and extension conveyors such as the electric motor designated at 40 operating main shaft 41 which is belted at 42 to main drive pulley 43 which drives the main power shaft 44 for embodying motion to the chain and sprocket system which drives the main and the extension conveyors.

The angle members 30 which facilitate the aligning of the extension conveyor frame 12 with the main conveyor frame 5 are shaped to provide oppositely extending flanges 30a which are apertured at 30b for the attachment of the cables 29 which operate over the guide pulleys 28 for orienting the extension conveyor frame about the main conveyor frame. The several degrees of orientation has been shown in Figs. 17–20.

Fig. 21 illustrates in perspective the manner in which the extension conveyor frame matches with the main conveyor frame. This will be understood more clearly from the side elevational view shown in Fig. 25 where the two frames are about to be matched or overlapped with the brackets 31 overlapping with the inside surfaces of angle members 30. In Fig. 24 I have shown the manner in which the coupling means constituted by the hinge members functions in moving the extension conveyor frame into alignment with the main conveyor frame. In Fig. 23 I have shown the manner in which the extension conveyor frame abuts with the main conveyor frame when cable 29 has been fully drawn taut by the winding and unwinding reel mechanism shown at 45 mounted on main frame 5.

It will be understood that the parts of the main frame and extension frame are assembled by interfitting and welding the components part by part so that there is complete freedom of contact between pivot shaft 35 and the main and extension frames except that provided by roller bearings 37 about which the extension frame orients into alignment with the main frame.

The disassembly of the apparatus is very simple as this merely requires the release of the latched reeling and unreeling mechanism shown at 45 and the release of cables 29 for movement of the extension frame 12 to a position beneath main frame 5 through the progressive steps shown in Figs. 17–20.

I have found the equipment of my invention highly practical and successful in operation, and while I have described my invention in one of its preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. An extension conveyor comprising a main conveyor frame, an extension conveyor frame, a wheeled chassis supporting said main conveyor frame, a pair of posts mounted adjacent the upper extremity of said main conveyor frame and extending substantially normal thereto, roller members pivoted on said posts, a pair of angle members mounted on the end of said extension conveyor frame adjacent the upper extremity of said main conveyor frame, brackets carried by the end of said main conveyor frame aligned with the angle members on said extension conveyor frame, said angle members and brackets each having transversely extending flanges adapted to approach or recede from each other to a limit in which said flanges are disposed in spaced substantially parallel planes, pivot means transversely interconnecting said brackets and said angle members for pivoting said extension conveyor frame with respect to said main conveyor frame, cables secured to the extremities of said angle members remote from said extension conveyor frame and extending in engagement with said roller members to a position adjacent the base of said main conveyor frame, means on said main conveyor frame for reeling and unreeling said cables for orienting said extension conveyor frame with respect to said main conveyor frame about said pivot means as a center for aligning said extension conveyor frame in a plane substantially coplanar with the plane of said main conveyor frame from a position substantially parallel with the underside of said main conveyor frame and in which said brackets include side plates which overlap the inside flanges of said angle members and wherein aligning means are carried by the inside flanges of said angle members, said side plates being apertured for the passage of said aligning means and a transverse shaft extending through said aligning means.

2. An extension conveyor comprising a main conveyor frame, an extension conveyor frame, a wheeled chassis supporting said main conveyor frame, a pair of posts mounted adjacent the upper extremity of said main conveyor frame and extending substantially normal thereto, roller members pivoted on said posts, a pair of angle members mounted on the end of said extension conveyor frame adjacent the upper extremity of said main conveyor frame, brackets carried by the end of said main conveyor frame aligned with the angle members on said extension conveyor frame, said angle members and brackets each having transversely extending flanges adapted to approach or recede from each other to a limit in which said flanges are disposed in spaced substantially parallel planes, pivot means transversely interconnecting said brackets and said angle members for pivoting said extension conveyor frame with respect to said main conveyor frame, cables secured to the extremities of said angle members remote from said extension conveyor frame and extending in engagement with said roller members to a position adjacent the base of said main conveyor frame, means on said main conveyor frame for reeling and unreeling said cables for orienting said extension conveyor frame with respect to said main conveyor frame about said pivot means as a center for aligning said extension conveyor frame in a plane substantially coplanar with the plane of said main conveyor frame from a position substantially parallel with the underside of said main conveyor frame, and in which said brackets include side plates which project beyond the extremity of said main conveyor frame and overlap with said pair of angle members and wherein both said side plates and angle members carry aligning means on the side faces thereof and means extending transversely through said aligning means for pivoting said extension conveyor frame with relation to said main conveyor frame.

3. An extension conveyor comprising a main conveyor frame, an extension conveyor frame, a wheeled chassis supporting said main conveyor frame, a pair of posts mounted adjacent the upper extremity of said main conveyor frame and extending substantially normal thereto, roller members pivoted on said posts, a pair of angle members mounted on the end of said extension conveyor frame adjacent the upper extremity of said main conveyor frame, brackets carried by the end of said main conveyor frame aligned with the angle members on said extension conveyor frame, said angle members and brackets each having transversely extending flanges adapted to approach or recede from each other to a limit in which said flanges are disposed in spaced substantially parallel planes, pivot means transversely interconnecting said brackets and said angle members for pivoting said extension conveyor frame with respect to said main conveyor frame, cables secured to the extremities of said angle members remote from said extension conveyor frame and extending in engagement with said roller members to a position adjacent the base of said main conveyor frame, means on said main conveyor frame for reeling and unreeling said cables for orienting said extension conveyor frame with respect to said main conveyor frame about said pivot means as a center for aligning said extension conveyor frame in a plane substantially coplanar with the plane of said main conveyor frame from a position substantially parallel with the underside of said main conveyor frame and in which said angle members carry roller bearing housings on the flanges thereof projecting outwardly therefrom, roller bearings in said housings, and aligning sleeves attached to said flanges of said angle members and projecting interiorly therefrom and into said main conveyor frame and in which said pivot means is constituted by a shaft projecting transversely of both of said conveyor frames and through said roller bearings.

4. An extension conveyor comprising a main conveyor frame, an extension conveyor frame, a wheeled chassis supporting said main conveyor frame, a pair of posts mounted adjacent the upper extremity of said main conveyor frame and extending substantially normal thereto, roller members pivoted on said posts, a pair of angle members mounted on the end of said extension conveyor frame adjacent the upper extremity of said main conveyor frame, brackets carried by the end of said main conveyor frame aligned with the angle members on said extension conveyor frame, said angle members and brackets each having transversely extending flanges adapted to approach or recede from each other to a limit in which said flanges are disposed in spaced substantially parallel planes, pivot means transversely interconnecting said brackets and said angle members for pivoting said extension conveyor frame with respect to said main conveyor frame, cables secured to the extremities of said angle members remote from said extension conveyor frame and extending in engagement with said roller members to a position adjacent the base of said main conveyor frame, means on said main conveyor frame for reeling and unreeling said cables for orienting said extension conveyor frame with respect to said main conveyor frame about said pivot means as a center for aligning said extension conveyor frame in a plane substantially coplanar with the plane of said main conveyor frame from a position substantially parallel with the underside of said main conveyor frame and in which said angle members are provided with spacing sleeves extending inwardly toward each other in alignment with anti-friction bearing housings carried by said angle members and projecting outwardly therefrom, said pivot means comprising a shaft extending through said anti-friction bearing housings and through said sleeves, anti-friction bearings disposed between said pivot means and said anti-friction bearing housings and connections between said brackets and said sleeves whereby said extension conveyor frame may be oriented with respect to said main conveyor frame.

References Cited in the file of this patent

UNITED STATES PATENTS

| | | |
|---|---|---|
| 1,447,580 | Tollefson | Mar. 6, 1923 |
| 2,368,414 | Eggleston | Jan. 30, 1945 |
| 2,477,790 | Farr et al. | Aug. 2, 1949 |

FOREIGN PATENTS

| | | |
|---|---|---|
| 858,866 | France | Dec. 5, 1940 |